United States Patent [19]

Tokuda et al.

[11] Patent Number: 4,996,558

[45] Date of Patent: Feb. 26, 1991

[54] COLLATING DEVICE

[75] Inventors: Kanji Tokuda; Yoshihiko Saeki; Kiichiro Sakamoto, all of Kanagawa; Fumio Matsumoto, Tokyo, all of Japan

[73] Assignee: Fuji Photo Film Co., Ltd., Kanagawa, Japan

[21] Appl. No.: 217,210

[22] Filed: Jul. 11, 1988

[30] Foreign Application Priority Data

Jul. 30, 1987 [JP] Japan ................................ 62-191188
Jul. 30, 1987 [JP] Japan ................................ 62-191186

[51] Int. Cl.[5] ................................ G03B 27/48
[52] U.S. Cl. ................................ 355/50
[58] Field of Search ................................ 355/40, 41, 50, 35, 355/38, 68

[56] References Cited

U.S. PATENT DOCUMENTS

| | | | |
|---|---|---|---|
| 4,821,061 | 4/1989 | Gudmundson et al. | 355/40 |
| 4,823,163 | 4/1989 | Rollet et al. | 355/41 |

FOREIGN PATENT DOCUMENTS

| | | |
|---|---|---|
| 0136980 | 4/1985 | European Pat. Off. . |
| 0222212 | 5/1987 | European Pat. Off. . |
| 0286548 | 10/1988 | European Pat. Off. . |
| 0293887 | 12/1988 | European Pat. Off. . |
| 56-35862 | 8/1981 | Japan . |
| 61-254946 | 11/1986 | Japan . |

*Primary Examiner*—Brian W. Brown
*Attorney, Agent, or Firm*—Sughrue, Mion, Zinn, Macpeak & Seas

[57] ABSTRACT

Disclosed is a collating device for collating the images on a photographic film with those printed on a printing paper from the photographic film while conveying the film and the printing paper. The collating device includes a reading device for reading a frame number for identifying the frame image on the film, and a printing device for printing the frame number which has been read by the reading device on the printing paper on which has been printed the image on the film which corresponds to that frame member. The frame numbers of the film are printed on the printing paper on which have been printed the images on the film. In consequence, the print images on the printing paper are easily made to correspond to the corresponding frame images on the film, and designation of the frames is facilitated.

14 Claims, 15 Drawing Sheets

COLLATING DEVICE

BACKGROUND OF THE INVENTION

1. Field of the Invention

The present invention relates to a collating device, and, more particularly, to a collating device for collating images on a film with the images printed on a sheet of printing paper from the film.

2. Description of the Prior Art

The sheet of printing paper on which an image from a negative film is printed by a printing device is developed by a developing device, and is then cut into individual prints for each frame.

Printing is conducted by the printing device as follows: after a semicircular notch has been provided by a notcher at one edge of a negative film for each frame thereof, the negative film is conveyed. The conveyance of the film is stopped when the notch is detected by a photoelectric switch so that the frame image corresponding to the detected notch can be located at a position for printing, and the frame image is then printed on the printing paper. Thereafter, the printing paper is developed by a developing device, and is fed to a collating device where it is cut into individual prints for each frame image.

The negative film is also fed to the collating device. In the collating device, the negative film is checked with the finished printing paper whether or not it corresponds to the printing paper, is cut into groups of several frames, and is placed in a negative cover. It is then packed together with the prints in an envelope ready for collection by the customer.

The collating device is adapted to determine whether or not the images on the printing paper correspond to those on the negative film (such a collating device being disclosed in the specifications of Japanese Patent Publication No. 35862/1981 and Japanese Patent Laid-Open No. 254946/1986).

Therefore, the printing paper and the negative film are packed after it has been confirmed by collation that the images thereon correspond with each other, and the shipping efficiency is thereby improved.

However, when a customer orders additional prints by referring to already printed images after he has received the packed prints, the printed images must be visually checked with those on the negative film, and it is therefore not easy to designate the relevant frames

SUMMARY OF THE INVENTION

In view of the aforementioned problems of the prior art, an object of the present invention is to provide a collating device which enables the images on a printing paper to be easily checked with the frame images on a photographic film so as to facilitate the designation of selected frames To this end, the present invention provides a collating device for collating the images carried on a photographic film with those printed on a printing paper from the photograhic film while the film and the printing paper are being conveyed. The collating device comprises a reading device for reading the frame number recorded on the film which enables the frame image to be identified, and a printing device for printing the frame number which has been read by the reading device on the printing paper on which has been printed the image on the film which corresponds to that frame number.

In the thus-arranged collating device, the frame number for the image on the film which corresponds to the image on the printing paper is read by the reading device, and the frame number so read is printed on the printing paper on which that image has been printed by a printer. In consequence, when the frame images on the film are to be searched for by referring to the images on the printing paper, they can be checked with the images on the printing paper by referring to the frame numbers appended to the printing paper In this way, individual frames can be easily designated when a customer orders additional prints

DESCRIPTION OF THE PREFERRED EMBODIMENTS

Figure 3:
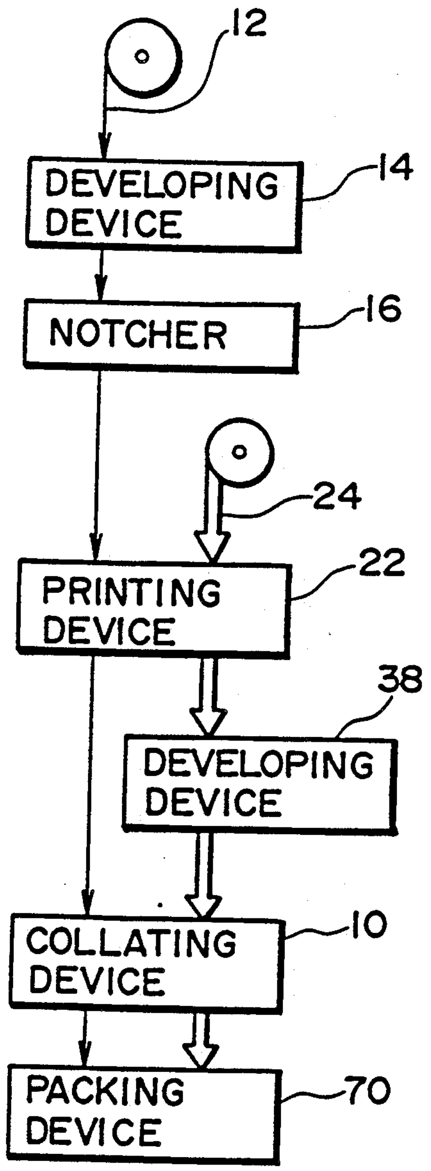
FIG. 3 is a block diagram of a photographic processing system to which the collating device of the present invention is applied.

A first embodiment of the present invention will be described below Referring first to FIG. 3 which diagrammatically shows a photographic processing system to which a collating device 10 of the first embodiment is applied, a negative film 12 is developed by a developing device 14, and is then fed to a notcher 16

Figure 6:
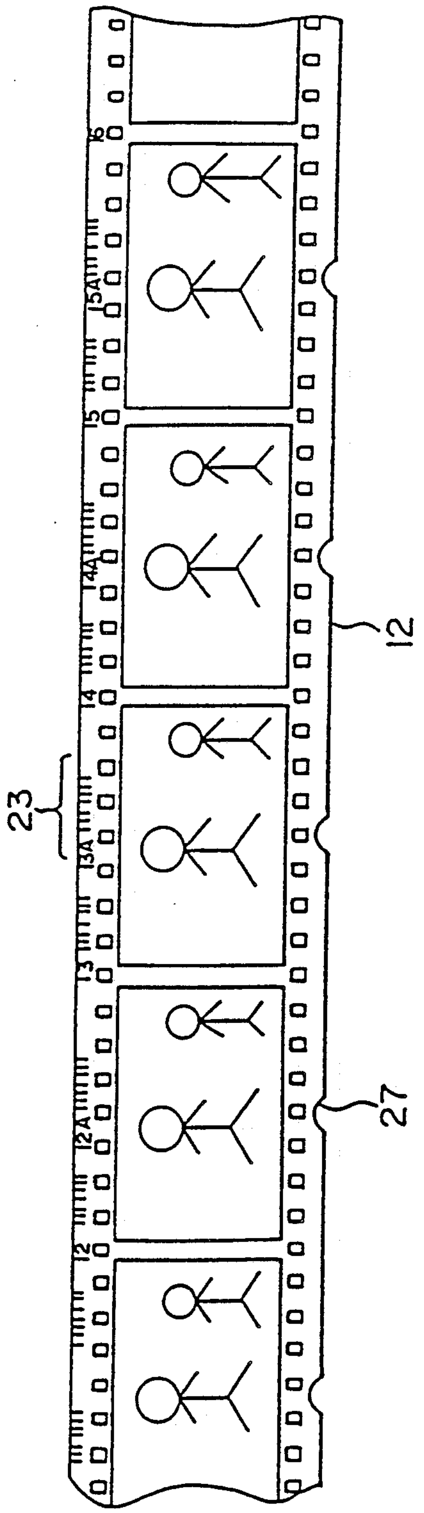
FIG. 6 is a plan view of a negative film.

In the notcher 16, a notch 27 is provided on the edge of the negative film 12 for each frame image, as shown in FIG. 6.

Figure 4:
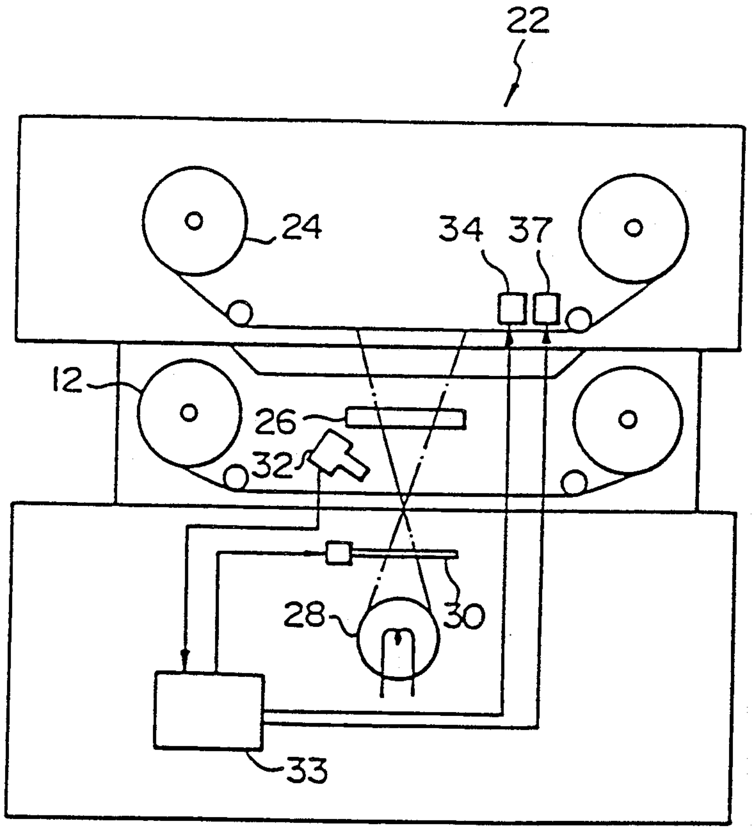
FIG. 4 is a front view of a printing device.
Figure 5:
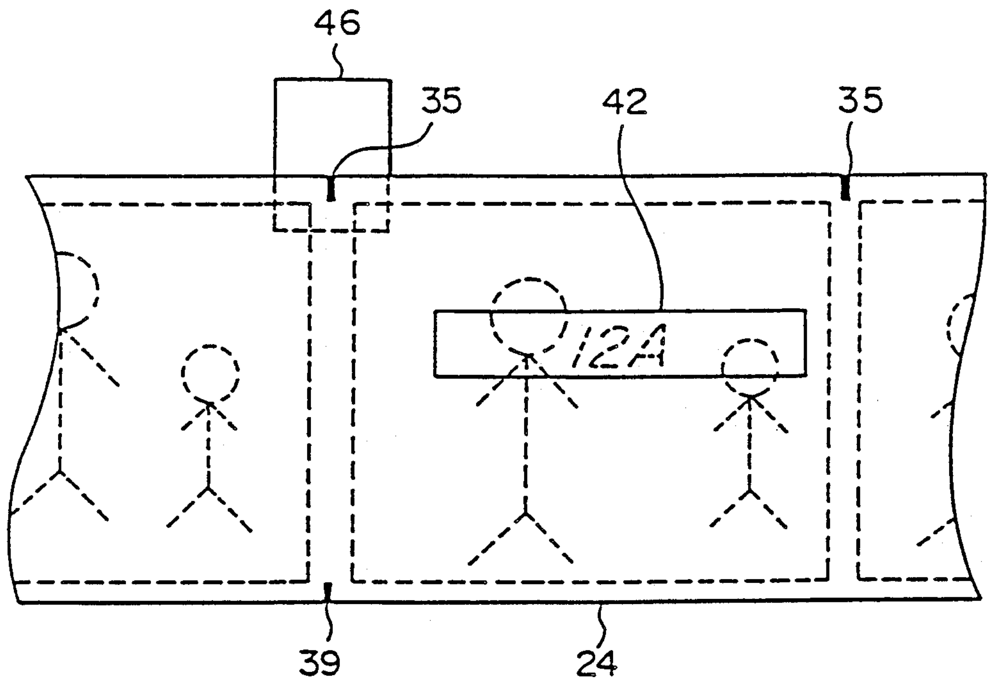
FIG. 5 is a rear view of a printing paper, showing a state in which the printing paper is made to correspond to a printer.

The negative film 12 provided with the notch 27 is then processed by a printing device 22. As shown in FIG. 4, the printing device 22 includes an optical system 26, and a light source 28 which prints images on the negative film 12 on a printing paper 24. It also includes a filter 30 which is disposed between the negative film 12 and the light source 28, and a density scanner 32 which is disposed in the vicinity of the position at which printing takes place, the filter 30 and the density scanner 32 being connected to the control circuit 33. The density scanner 32 is adapted to measure the photographic density of the frame image on the negative film 12 which is located at the printing position, and the density measured by the density scanner 32 is input to the control circuit 33 as exposure correcting information. The control circuit 33 actuates the filter 30 on the basis of this information so that the exposure of the negative film 12 can be adjusted to a suitable value when the image is printed on the printing paper 24 On the conveying path of the printing paper 24 carrying the image are disposed a cutting marker 34 and a sorting marker 37. As shown in FIG. 5, the cutting marker 34 is adapted to provide a cutting mark 35 for each interval between the frame images on the printing paper 24, whereas the sorting marker 37 is adapted to put a sorting mark 39 for each unit of negative film (for each order)

Figure 1:
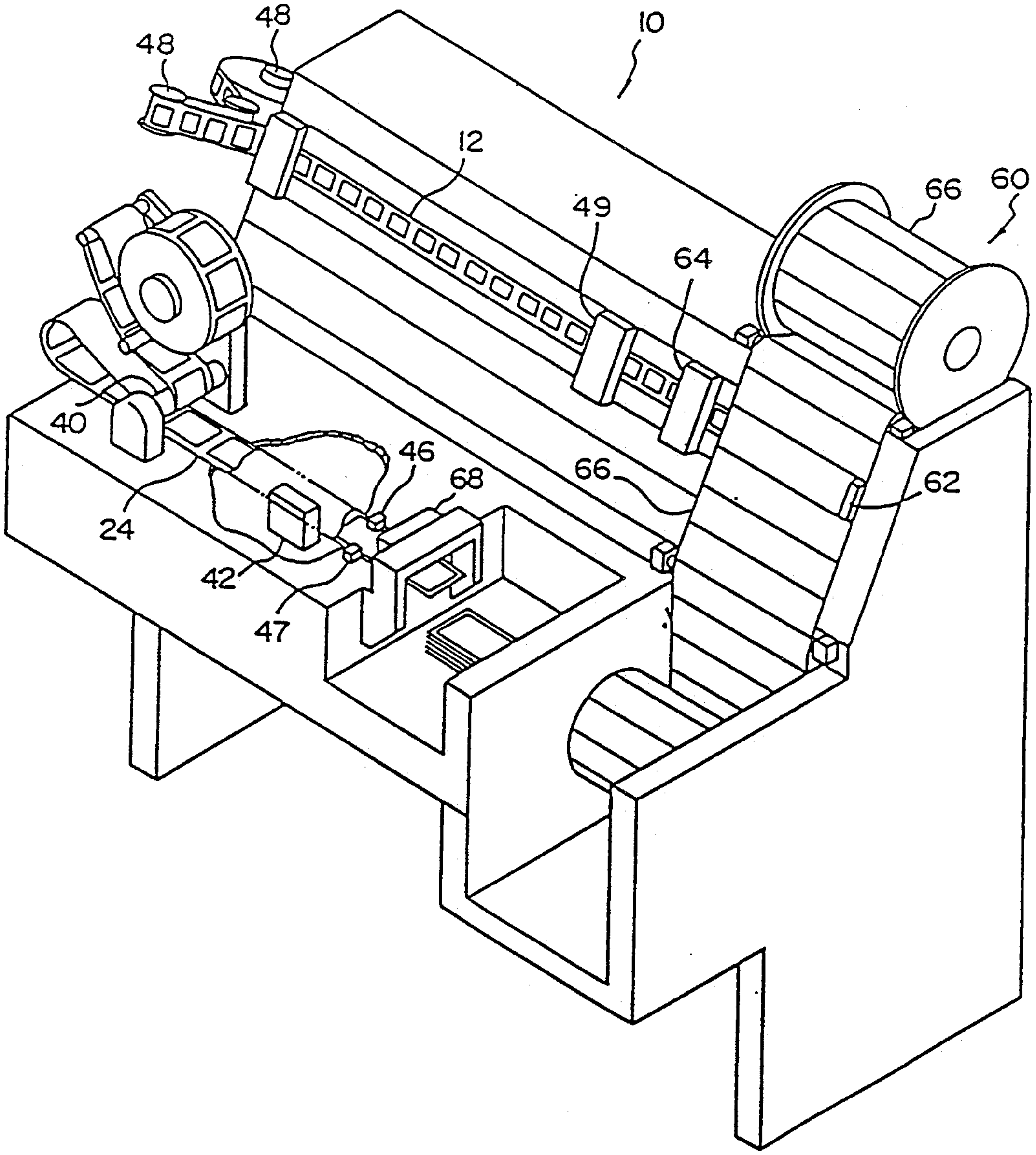
FIG. 1 is a partially broken away perspective view of a collating device, showing a first embodiment of the present invention.
Figure 2:
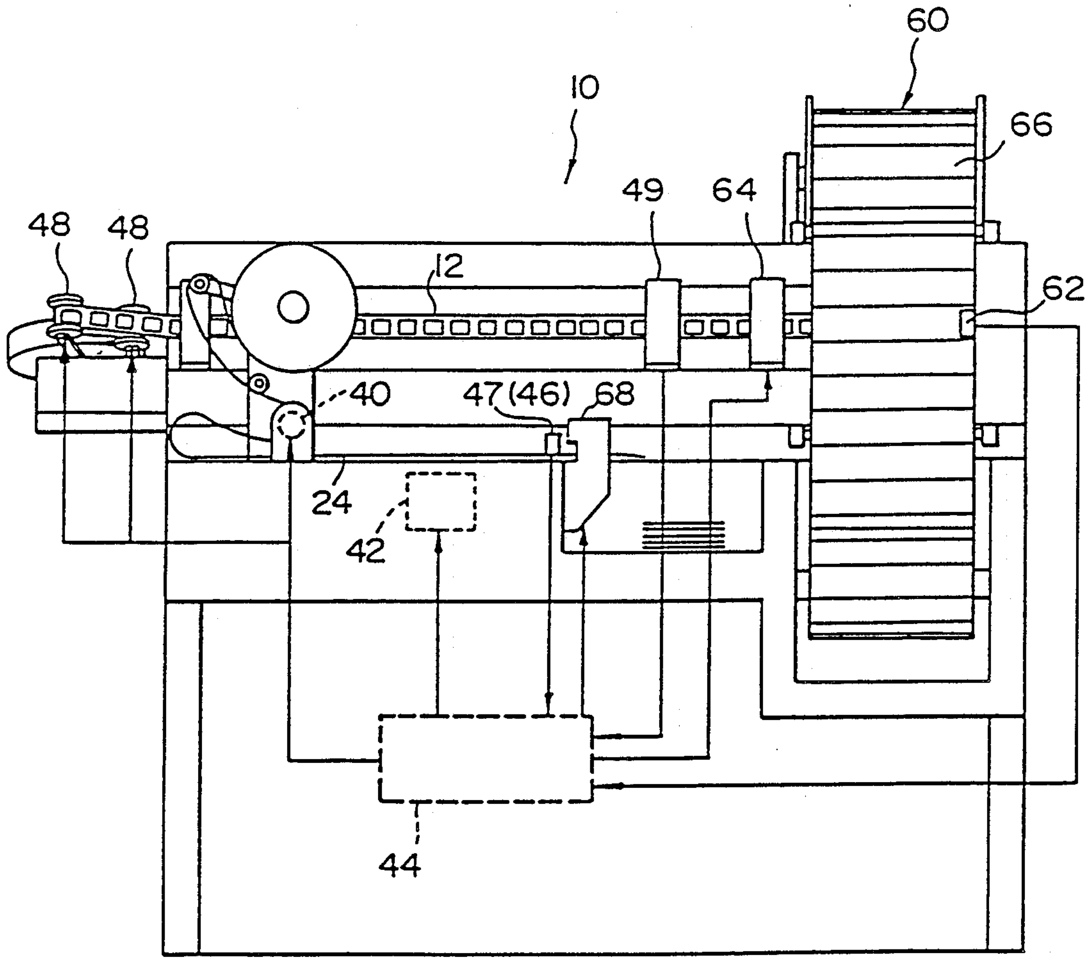
FIG. 2 is a schematic front view of the collating device of FIG. 1.

After the images have been printed on the printing paper, 24, the printing paper 24 is developed by a developing device 38, and is then checked with the negative film by the collating device 10. FIG. 1 is a partially cutaway perspective view of the collating device 10, and FIG. 2 is a schematic front view of the collating device of FIG 1.

The collating device 10 includes a plurality of rollers 40 for conveying the printing paper 24 to the central position of the device at which collation takes place The printing paper 24 is conveyed with its images facing upward.

The collating device 10 also includes a plurality of rollers 48 for conveying the negative film 12 in synchronism with the conveyance of the printing paper 24 by the rollers 40.

On the conveying path of the negative film 12 is disposed a film reader 49 for reading a bar code 23 which is appended to the negative film 12, as shown in FIG. 6, and which represents the frame number. The film reader 49 is connected to a control circuit 44, and the signal representing the read frame number is thereby input to the control circuit, 44.

A cutting device in sorter 60 is disposed at the end of the conveying path of the negative film 12. In the sorter 60, when the presence of the negative film 12 is detected by a stopped point sensor 62 mounted at the end of the sorter, a cutter 64 is actuated so as to cut the negative film 12, and the cut negative film piece is then automatically placed in a negative cover 66. The stopped point sensor 62 and the cutter 64 are connected to the control circuit 44.

A printer 42 for conducting printing on the printing paper 24 is disposed within the collating device 10 in such a manner as to face the rear surface of the conveyed printing paper 24. The printing head of the printer 42 is disposed in the same direction as that in which the printing paper 24 is conveyed so that printing can be sequentially conducted in the longitudinal direction of the printing paper 24 while it is being conveyed. The printer 42 is connected to the control circuit 44.

A cutting mark sensor 46 and a sorting mark sensor 47 which are connected to the control device 44 are disposed in such a manner as to face the upper surface of the printing paper 24. The cutting mark sensor 46 and the sorting mark sensor 47 are adapted to respectively detect the cutting mark 35 and the sorting mark 39 which have been appended to the printing paper 24 in the printing device 22, the detection signals being sent to the control circuit 44. The control circuit 44 actuates the printer 42 on the basis of the cutting mark detection signal sent from the cutting mark sensor 46 so as to print the frame number input from the film reader 49 on the rear surface of the frame image located immediately above the printer 42 when the presence of the cutting mark 35 is detected. The sorting mark detection signal from the sorting mark sensor 47 is used by the control circuit 44 to determine the completion of collating operation for each order (for each customer).

At the end of the conveying path of the printing paper 24 which is separated from the cutting mark sensor 46 and the sorting mark sensor 47 by a distance corresponding to one frame image is disposed a cutter 68 for cutting the printed printing paper 24. The cutter 68 is connected to the control circuit 44, and is actuated when the cutting mark sensor 46 detects the presence of the cutting mark 35 so as to enable the printed printing paper 24 to be cut for every frame.

Figure 7:
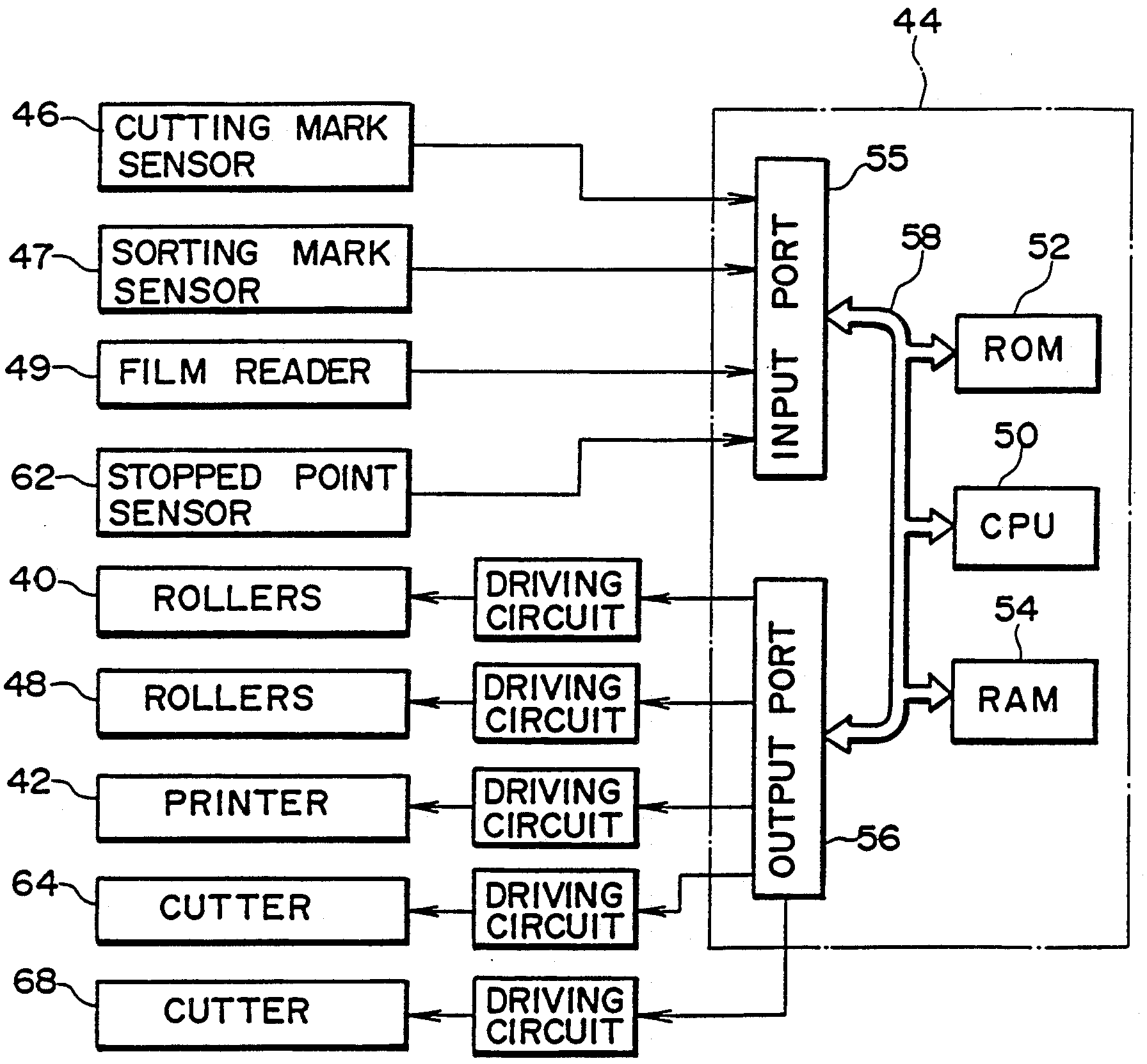
FIG. 7 is a block diagram of a control circuit.

As shown in FIG. 7, the control circuit 44 includes a central processing device (CPU) 50, a read-only-memory (ROM) 2, a random-access-memory (RAM) 54, an input port 55, an output port 56, and a bus 58 for connecting these components. The input port 55 is connected to the cutting mark sensor 46, the sorting mark sensor 47, the film reader 49 and the stopped point sensor 62, whereas the output port 56 is connected through corresponding driving circuits to the rollers 40 and 48, the printer 42, and the cutters 64 and 68.

The operation of the first embodiment will now be described.

The developed negative film 12 is notched by the notcher 16 so as to form the notch 27 for each frame image The negative film 12 is then fed to the printing device 22 where the images on the film are printed on the printing paper 24 At this time, the corrected amount of exposure of the negative film 12 is determined for each frame image, and the filter 30 is controlled by the control circuit 33 on the basis of the correction information which is input to the control circuit 33 by a key board 32.

After printing has been conducted on the printing paper 24, the cutting mark 35 is provided on the printing paper 24 by the cutting marker 34 for each interval between the frame images, and the sorting mark 39 is provided by the sorting marker 37 for each order.

The printing paper 24 on which the images have been printed and to which the cutting mark 35 and the sorting mark 39 have been appended by the printing device 22 is developed by the developing device 38, and is then fed to the collating device 10 where it is collated with the negative film 12

Figure 8:
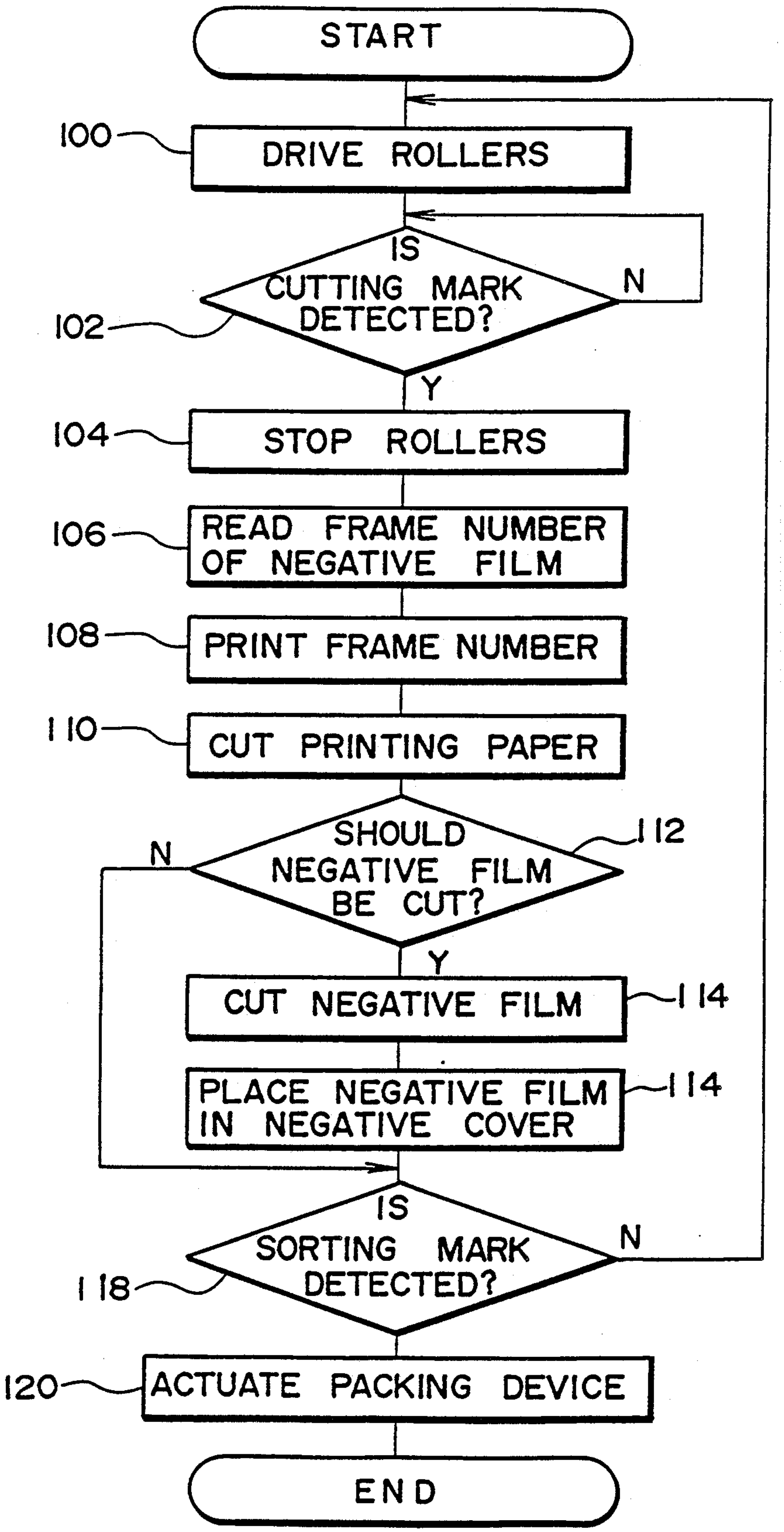
FIG. 8 is a flowchart of the control routine of the control circuit.

In the collating device 10, the printing paper 24 is conveyed to the position at which collation takes place by the rollers 40, whereas the negative film 12 is conveyed by the rollers 48 in synchronism with the conveyance of the printing paper 24 During this conveyence, the frame number is printed on the rear surface of the printing paper 24 by the printer 42. FIG. 8 is a flowchart of the control routine of the printer 42.

When the collating device 10 is actuated, the rollers 40 and 48 are driven so as to move the printing paper 24 and the, negative film 12 synchronously in step 100. Thereafter, in step 102, it is determined whether or not the cutting mark 35 is detected on the basis of the signal from the cutting mark sensor 46. If the answer is affirmative, the rollers 40 and 48 are stopped in step 104, and the frame number appended on the negative film 12 is then read by the film reader 49 in step 106 Thereafter, in step 108, the frame number so read is printed on the rear surface of the printing paper 24 by the printer 42, and the cutter 68 is then actuated so as to cut the printing paper 24 for each frame image in step 110. In step 112, it is determined on the basis of the signal from the stopped point sensor 62 whether or not the negative film 12 should be cut If the answer is yes, the cutter 64 is actuated so as to cut the negative film 12 in step 114, and the cut negative film 12 is then placed in the negative cover 66 in step 116.

On the other hand, if it has been determined that the negative film should not be cut in step 112, the processings in steps 114 and 116 are skipped, and the flow goes to step 118 where it is determined on the basis of the signal from the sorting mark sensor 47 whether or not the sorting mark 39 has been detected. If the answer is negative, the process returns to step 100, and the above-described routine is repeated until collation of one order (one customer) is completed. On the other hand, if it has been determined that the sorting mark 39 was detected in step 118, a packing device 70 is actuated in step 120.

The printing paper on which the frame number has been printed by the collating device 10, as well as the negative film 12, are packed for each customer by the packing device 70 for shipping.

In consequence, when a customer orders additional prints after he has received the prints, the printing paper 24 is made to correspond to the negative film 12 by referring to the frame number printed on the rear surface of the prints, and the designation of the frames are therefore facilitated.

Figure 11:
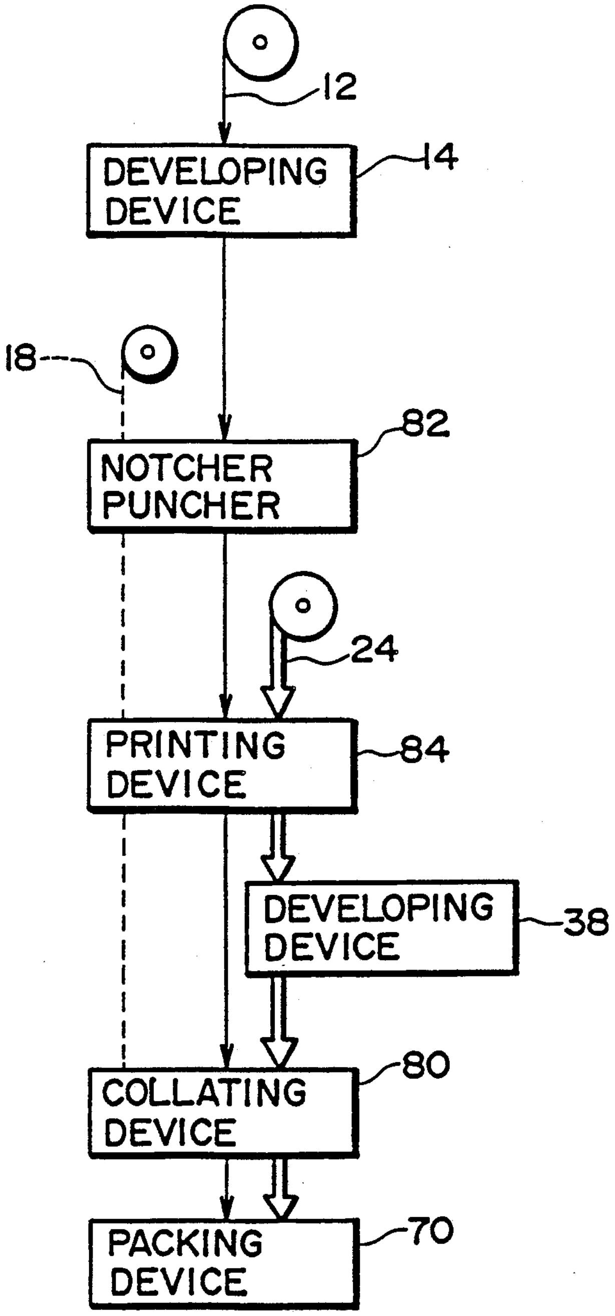
FIG. 11 is a block diagram of a photographic processing system to which the collating device of FIG. 9 is applied.

Next, a second embodiment of the present invention will be described below. The same reference numerals are used to designate the parts which correspond to those in the first embodiment, and the description thereof is omitted FIG. 11 schematically shows a photographic processing system to which a collating device 80 of the second embodiment is applied.

Figure 12:
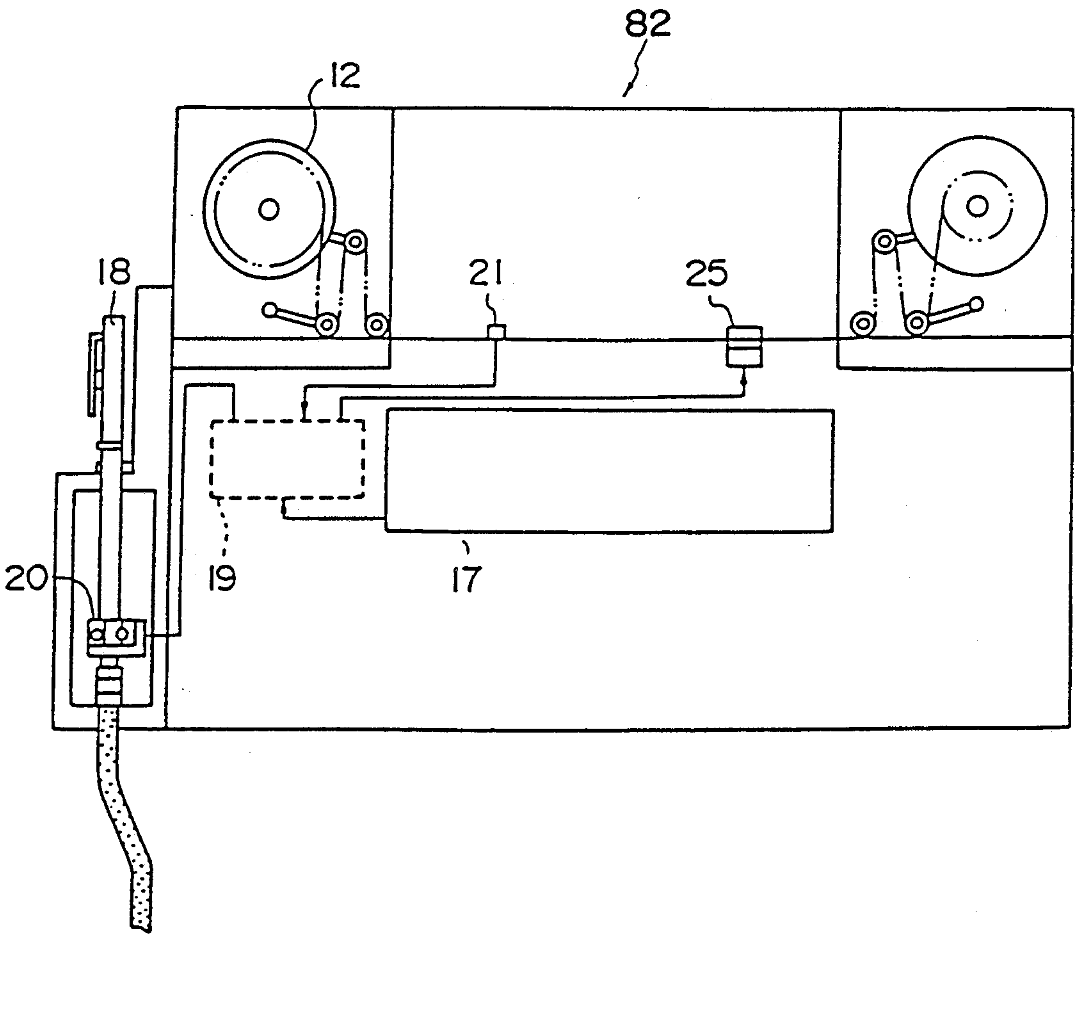
FIG. 12 is a schematic front view of a notcher puncher.
Figure 14:
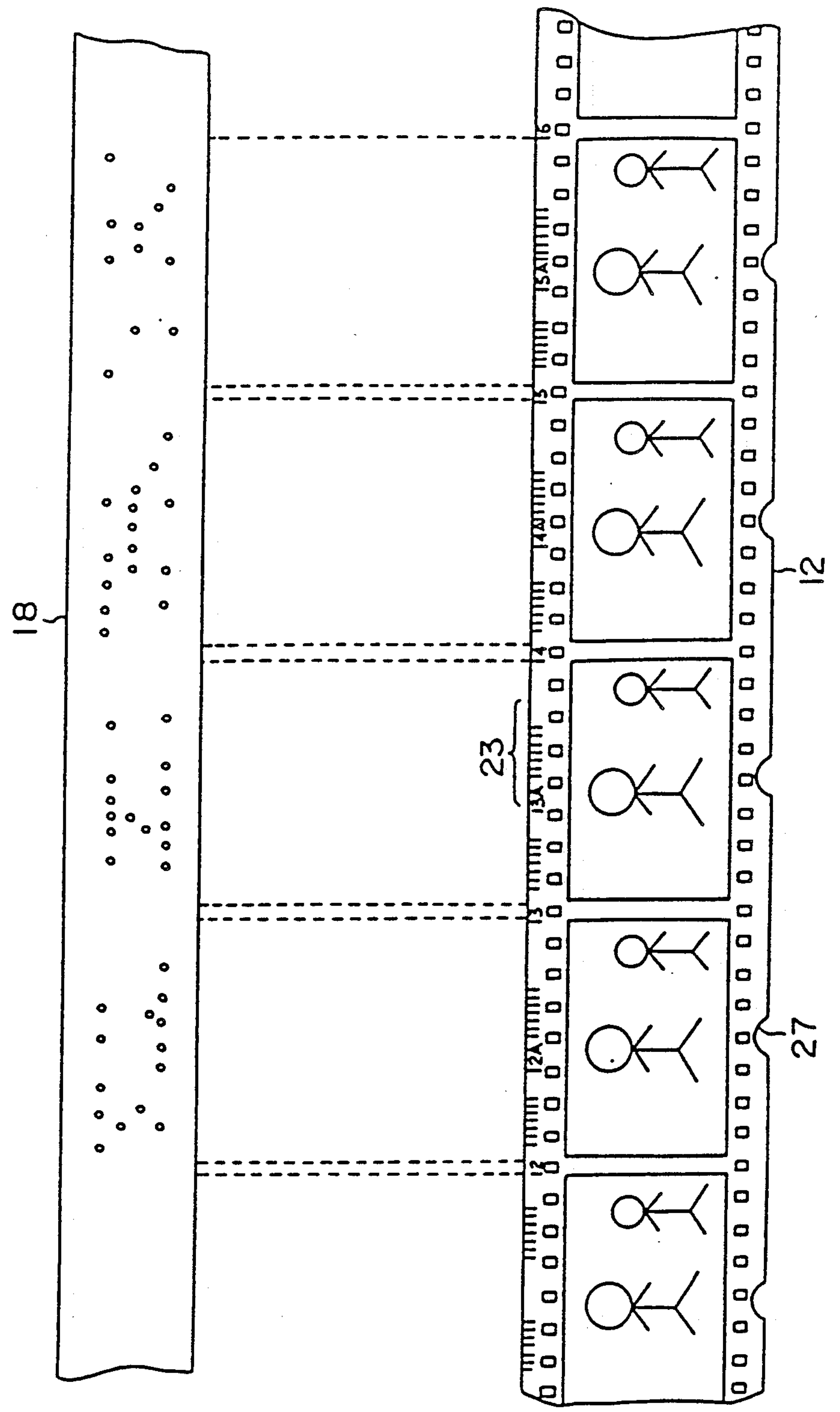
FIG. 14 is a plan view, showing a state in which a paper tape is made to correspond to a negative film.

After the negative film 12 has been developed by the developing device 14, it is fed to a notcher puncher 82. As shown in FIG. 12, in the notcher puncher 82, a paper tape 18 is conveyed in synchronism with the conveyance of the negative film 12. In the notcher puncher 82 is disposed a film reader 21 for reading the bar code 23 which is appended to the negative film 12 in the manner shown in FIG. 14, and which represents the frame number. The film reader 21 is connected to a control circuit 19, and the bar code 23 so read, i.e., the frame number, is thereby input to the control circuit 19.

The notcher puncher 82 also includes a notching head 25 for notching the edge of the negative film 12 for each frame image so as to form a notch 27. The notching head 25 is connected to the control circuit 19.

In the notcher puncher 82, the exposure of the negative film 12 is determined for each frame image, and the exposure correcting information which is based on the detected exposure or the information representing the number of required prints is input to the control circuit 19 through a key board 17. The information is stored by a punch head 21 on the paper tape 18 together with the frame number read by the film reader 21.

Figure 13:
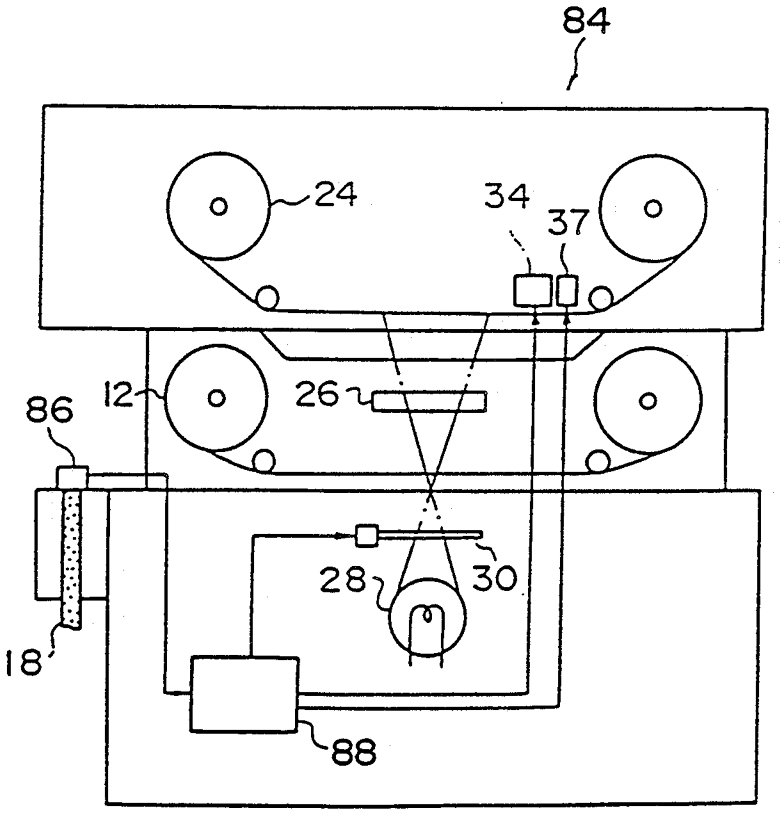
FIG. 13 is a schematic front view of a printing device.

The negative film whose exposure has been determined by the notcher puncher 82 and the paper tape 18 which stores the exposure correcting information, the frame number or the information on the number of prints are then fed to the printing device 84. As shown in FIG. 13, the printing device includes the optical system 26 and the light source 28 which print the image on the negative film 12 to the printing paper 24. It also includes the color filter 30 which is disposed between the negative film 12 and the light source 28 and which is connected to a control circuit 88, and a reader 86 for reading the exposure correcting information, the information representing the number of prints and the frame number which are stored in the paper tape 18. The reader 86 is disposed at one side of the printing device 84, and is connected to the control device 88. The reader 86 reads for each frame image of the negative film 12 the exposure correcting information from the paper tape 18 which is conveyed in synchronism with the conveyance of the negative film 12, and sends it to the control circuit 88. The control circuit 88 actuates the color filter-30 on the basis of this information so that the exposure of the negative film 12 is adjusted to an optimum value when the image is printed on the printing paper 24, and repeats printing in accordance with the print number information stored in the paper tape 18.

On the conveying path of the printing paper 24 on which the images have been printed are disposed the cutting marker 34 and the sorting marker 37. As in the first embodiment (shown in FIG. 5), the cutting marker 34 is adapted to append the cutting mark 35 for each interval between the frame images on the printing paper 23, whereas the sorting marker 37 is adapted to put the sorting mark 39 for each unit of negative film (for each order).

Figure 9:
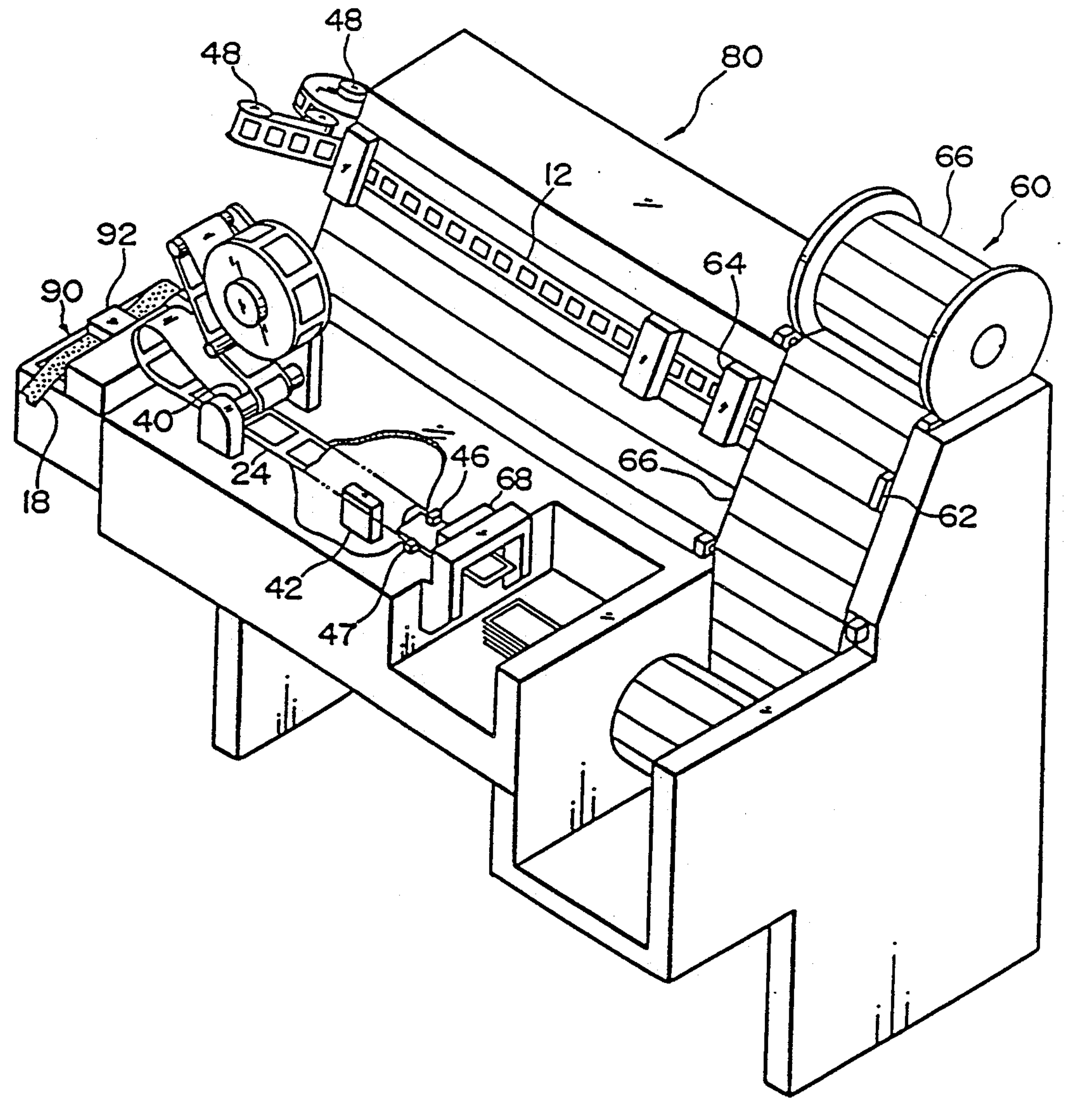
FIG. 9 is a partially cutaway perspective view of a collating device, showing a second embodiment of the present invention.
Figure 10:
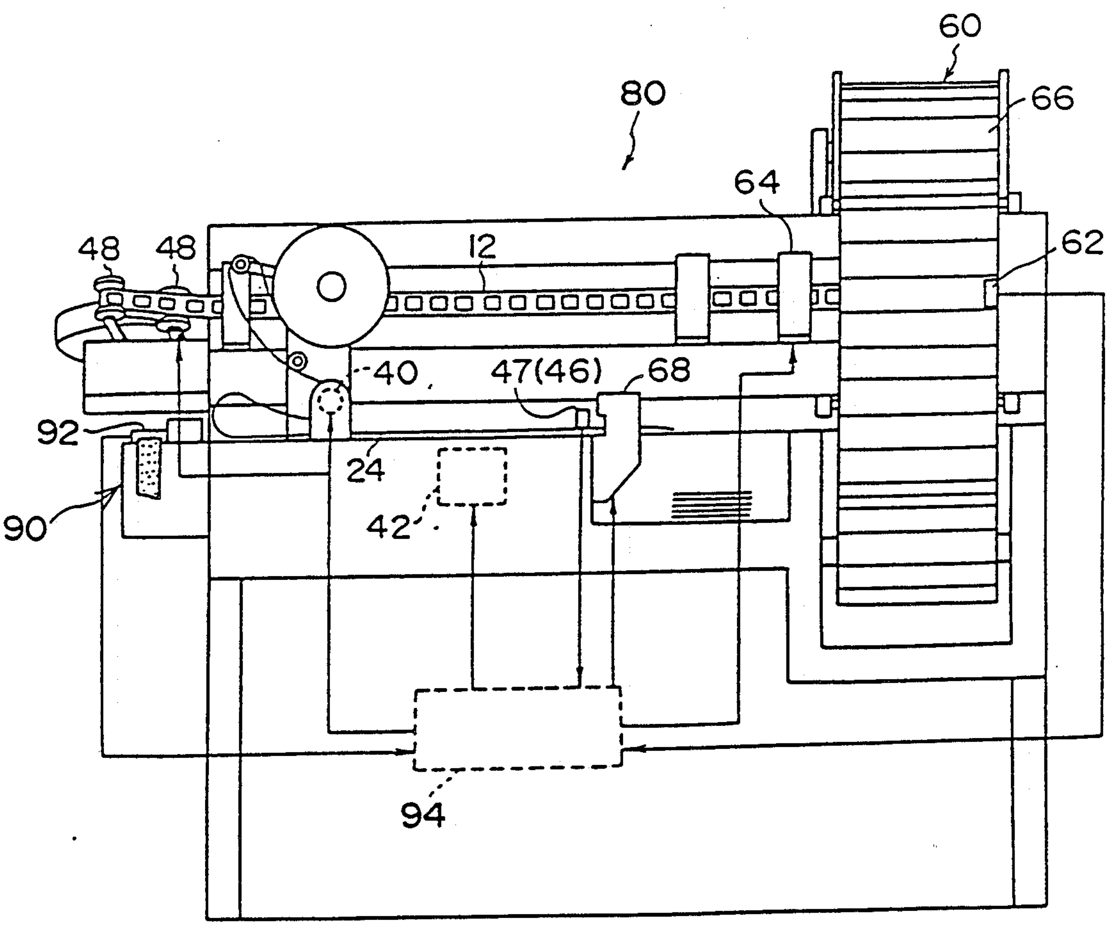
FIG. 10 is a schematic front view of the collating device of FIG. 9.

After the images have been printed on the printing paper 24, the printing paper 24 is developed by the developing device 38, and is then collated with the negative film 12 by a collating device 80. FIG. 9 is a partically cutaway perspective view of the collating device 80, and FIG. 10 is a schematic front view of the collating device.

Like the collating device of the first embodiment, the collating device 80 includes the plurality of rollers 40 for conveying the printing paper 24, and the plurality of rollers 48 for conveying the negative film 12.

A paper tape reader 90 is disposed at one side of the collating device 80 so as to feed the paper tape 18 in synchronism with the conveyance of the printing paper 24. The paper tape reader 90 has a reading head 92 for reading the frame number stored in the paper tape 18 The reading head 92 is connected to a control circuit 94, by which the frame number signal is input to the control circuit 94.

As in the first embodiment, the printer 42 for conducting printing on the printing paper 24 is disposed within the collating device 80 in such a manner as to face the rear surface of the printing paper 24. The printing head of the printer 42 is disposed in the same direction as that in which the printing paper 24 is conveyed, by which printing is sequentially conducted in the longitudinal direction of the printing paper 23 while it is being conveyed The printer 42 is connected to the control device 94.

The cutting mark sensor 46 and the sorting mark sensor 47 are disposed in such a manner as to face the upper surface of the printing paper 24, as in the first embodiment. Further, the cutter 68 is provided at the end of the conveying path of the printing paper 24.

Figure 15:
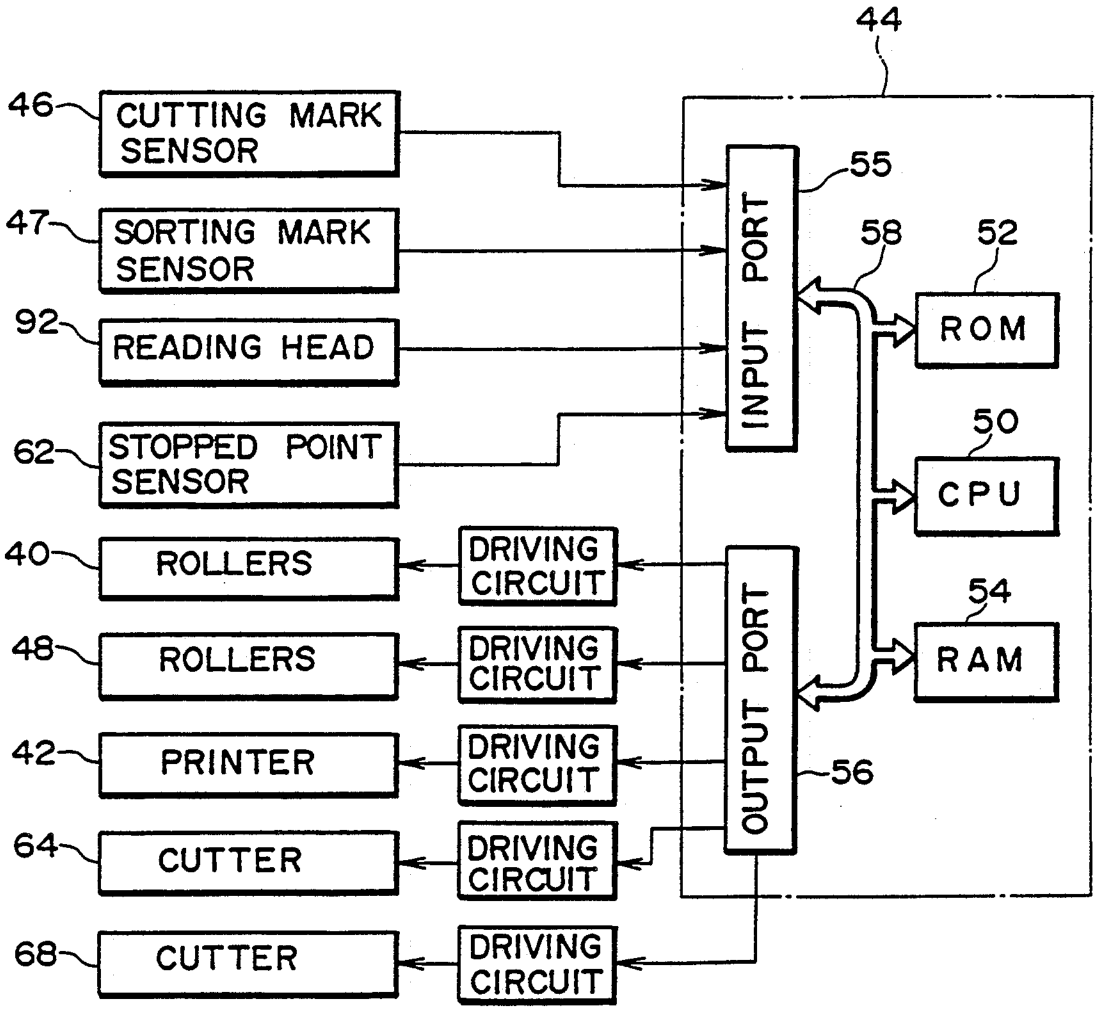
FIG. 15 is a block diagram of a control circuit.

As shown in FIG. 15, the control circuit 94 includes the central processing device (CPU) 50, the read-only-memory (ROM) 52, the random-access-memory (RAM) 54, the input port 55, the output port 56, and the bus 58 for connecting these components. The input port 55 is connected to the cutting mark sensor 46, the sorting mark sensor 47, the reading head 92, and the stopped point sensor 62, whereas the output port 56 is connected through corresponding driving circuits to the rollers 40 and 48, the printer 42, and the cutters 64 and 68.

The operation of the second embodiment will be now described.

The exposure of the developed negative film 12 is determined by the notcher puncher 82, and the exposure correcting information for printing and the frame number are stored in the paper tape 18. The negative film 12 is then fed to the printing device 84 where the images are printed on the printing paper 24 At this time, the paper tape 18 is conveyed in synchronism with the conveyance of the negative film 12, and the exposure correcting information which is stored in the paper tape 18 for each frame image is read by the reader 86, by which the color filter 30 is controlled when the images are printed.

After printing, the cutting mark 35 and the sorting mark 39 are provided on the printing paper 24 by the cutting marker 34 and the sorting marker 37 for each interval between the frame images and for each order, respectively.

The printing paper 24 on which the images have been printed by the printing device 22 and to which the cutting mark 35 and the sorting mark 39 are appended is developed by the developing device 38, and is then fed to the collating device 80 where it is collated with the negative film 12.

In the collating device 80, the printing paper 24 is conveyed to the position for collation by the rollers 40, while the paper tape 18 is conveyed in synchronism with the conveyance of the printing paper 24. Next, the control routine which is basically the same as that employed in the first embodiment is processed, by which the frame number is printed on the rear surface of the printing paper 24 by the printer 42. More specifically, the paper tape 18 is conveyed in synchronism with the conveyance of the printing paper 24, and when the cutting mark 35 is detected, the frame number stored in the paper tape 18 is read by the reading head 92 of the paper tape reader 90. Thereafter, the frame number so read is printed on the rear surface of the printing paper 24 by the printer 42.

Thus, in this embodiment, when a customer orders additional prints, the prints 24 and the negative film 12 are made to correspond with each other by referring to the frame number printed on the rear surface of each of the prints, and designation of the frames is therefore facilitated.

When the additional prints are to be produced by the order of a customer, the information representing the number of prints, as well as the frame number of the image on the negative film 12 which corresponds to the designated print image are stored in the paper tape 18 by the notcher puncher 82. Thereafter, printing is conducted in the same process as that described above As in the original printing, the paper tape 18 is conveyed in synchronism with the conveyance of the negative film 12 in this additional printing, and the information representing the number of prints which has been stored in the paper tape 18 is read by the reader 86 so as to conduct printing accordingly.

After the cutting mark 35 and the sorting mark 39 have been appended to the printing paper 24, the printing paper 24 is developed in the same process as that described above, and is then collated with the negative film 12 by the collating device 80.

When the printing paper 14 is collated with the negative film 12 to produce additional prints, the printing paper 24 and the paper tape 18 are also conveyed synchronously. At this time, the information representing the number of prints, as well as the frame number, are read from the paper tape 18, by which the same frame number is printed on the same print images.

The present embodiment employs the paper tape as storage medium. However, a magnetic tape or a floppy disk may also be used.

As will be understood from the foregoing description, the frame numbers on the film are respectively appended to the print images which correspond to those frame numbers. In consequence, the images on the printing paper can be easily made to correspond to the images on the film, and designation of the frames is therefor facilitated.

What is claimed is:

1. In a collating device for collating images on a photographic film with those printed on a printing paper from said photographic film while conveying said film and said printing paper, an improvement comprising:

- a reading device for reading a unique frame number recorded on said film for identifying each frame image; and
- a printing device for printing each unique frame number which has been read by said reading device on the printing paper on which has been printed the image of said film which corresponds to that frame number.

2. A collating device according to claim 1, wherein said reading device is a bar code reader for reading a bar code recorded on said film.

3. A collating device according to claim 1, wherein said printing device has a printing head which is disposed in a same direction as that in which said printing paper is conveyed in such a manner as to face a rear surface of said printing paper, said printer conducting printing in a longitudinal direction of said printing paper while said printing paper is being conveyed.

4. In a collating device for collating images on a photographic film with those printed on a printing paper from said photographic film while conveying said film and said printing paper, an improvement comprising:

- a reading device for reading a unique frame number recorded on said film for identifying each frame image;
- a printing device for printing each unique frame number which has been read by said reading device on the printing paper on which has been printed the image of said film which corresponds to that frame number and;
- a cutting mark sensor disposed on a conveying path of said printing paper for reading a cutting mark appended to said printing paper; and a sorting mark sensor disposed on the conveying path of said printing paper for reading a sorting mark appended to said printing paper.

5. A collating device according to claim 1, including conveying rollers for synchronously conveying said film and said printing paper.

6. A collating device according to claim 1, further including a cutter disposed on a conveying path of said printing paper for cutting said printing paper bearing said frame numbers for each frame image.

7. In a collating device for collating images on a photographic film with those printed on a printing paper from said photographic film while conveying said film and said printing paper, an improvement comprising:

a reading device for reading a unique frame number recorded on said film for identifying each frame image;

a printing device for printing each unique frame number which has been read by said reading device on the printing paper on which has been printed the image of said film which corresponds to that frame number and;

a film sensor for detecting said film, and a cutting device provided in a sorter unit disposed on the end of a conveying path of said film for cutting said film into predetermined lengths and accommodating said film after cutting when said film is detected by said film sensor.

8. In a collating device for collating images on a photographic film with those printed on a printing paper from said photographic film while conveying said film and said printing paper, an improvement comprising:

a first reading device for reading a unique frame number recorded on said film for identifying each frame image;

a storage medium for storing said unique frame number and exposure correction information related to each unique frame image corresponding to each unique frame number of said film;

a second reading device for reading said unique frame number from said storage medium; and a printing device for printing each unique frame number which has been read by said second reading device to the printing paper on which has been printed the image of said film which corresponds to said unique frame number.

9. A collating device according to claim 8, wherein said reading device is a paper tape reader for reading a paper tape which has stored the frame number.

10. A collating device according to claim 8, wherein said printing device has a printing head which is disposed in a same direction as that in which said printing paper is conveyed in such a manner as to face a rear surface of said printing paper, said printer conducting printing in the longitudinal direction of said printing paper while said printing paper is being conveyed.

11. A collating device according to claim 8, further including: a cutting mark sensor disposed on a conveying path of said printing paper for reading a cutting mark appended to said printing paper; and a sorting mark sensor disposed on the conveying path of said printing paper for reading a sorting mark appended to said printing paper.

12. A collating device according to claim 8, further including conveying rollers for synchronously conveying said film and said printing paper.

13. A collating device according to claim 8, further including a cutter disposed on a conveying path of said printing paper for cutting said printing paper bearing said frame number for each frame image.

14. A collating device according to claim 8, further including: a film sensor for detecting said film, and a cutting device provided in a sorter unit disposed on an end of a conveying path of said film for cutting said film into predetermined lengths and accommodating said film after cutting when the film is detected by said film sensor.

* * * * *